(12) United States Patent
Graube et al.

(10) Patent No.: US 9,282,459 B2
(45) Date of Patent: Mar. 8, 2016

(54) USAGE OF BEACON FOR LOCATION BASED SECURITY

(71) Applicant: QUALCOMM TECHNOLOGIES INTERNATIONAL, LTD., Cambridge (GB)

(72) Inventors: Nicolas Graube, Barrington (GB); Ben Tarlow, South Cambs (GB); Murray Robert Jarvis, Stapleford (GB)

(73) Assignee: QUALCOMM Technologies International, LTD., Cambridge (GB)

( * ) Notice: Subject to any disclaimer, the term of this patent is extended or adjusted under 35 U.S.C. 154(b) by 384 days.

(21) Appl. No.: 13/716,365

(22) Filed: Dec. 17, 2012

(65) Prior Publication Data
US 2014/0171025 A1    Jun. 19, 2014

(51) Int. Cl.
| | |
|---|---|
| H04W 24/00 | (2009.01) |
| H04W 12/08 | (2009.01) |
| H04W 4/02 | (2009.01) |
| G01S 5/02 | (2010.01) |
| G01S 5/06 | (2006.01) |
| G01S 5/16 | (2006.01) |
| H04M 3/42 | (2006.01) |
| H04L 29/06 | (2006.01) |
| H04W 64/00 | (2009.01) |

(52) U.S. Cl.
CPC ............ *H04W 12/08* (2013.01); *G01S 5/0205* (2013.01); *G01S 5/0289* (2013.01); *G01S 5/06* (2013.01); *G01S 5/16* (2013.01); *H04W 4/021* (2013.01); *H04W 64/00* (2013.01)

(58) Field of Classification Search
CPC .................................................... H04W 24/00
USPC ...................................................... 455/456.1
See application file for complete search history.

(56) References Cited

U.S. PATENT DOCUMENTS 8,156,539 B1 *   4/2012   Nelson ............................. 726/2

FOREIGN PATENT DOCUMENTS

| GB | 2386014 | * | 3/2003 |
|---|---|---|---|
| GB | 2386014 | | 9/2003 |
| WO | WO 2005/081012 | | 9/2005 |

OTHER PUBLICATIONS

Tarlow, B.J., Bartlett, D.W., Duffett-Smith, P.J., "High accuracy network positioning technology for mobile phones in GSM and 3G," Mobile Location Workshop (MLW 2004), May 27-28, 2004, Athens, Greece.
GB Search Report issued in related GB Application No. 1321807.8 dated Apr. 8, 2014.

* cited by examiner

*Primary Examiner* — Huy C Ho
(74) *Attorney, Agent, or Firm* — The Marbury Law Group, PLLC

(57) ABSTRACT

A system for location based security which includes a plurality of receivers. Each of the receivers determines times of arrival of received time varying signals. The system also includes a server in communication with the receivers and a mobile device. The server receives the times of arrival from the receivers, and times of arrival of the time varying signals determined by the mobile device. The server determines a location of the mobile device based on the times of arrival. The server may then authorize the mobile device to perform secure communication over the secure communication network when the location of the mobile device is determined to be in an authorized communication area defined based on the times of arrival received from the receivers.

19 Claims, 5 Drawing Sheets

USAGE OF BEACON FOR LOCATION BASED SECURITY

The present invention is directed to a system and method for providing location based security between a mobile device and other devices on a secure network. In one example, multiple receivers are positioned such that they define an authorized communication area (e.g. a perimeter). In general, these receivers utilize locally available time varying signals to determine if the mobile device is located within the authorized area. If the mobile device is determined to be located within the authorized area, the mobile device is enabled (e.g. given an encryption key) to communicate over the secure network with the other devices.

BACKGROUND

It some scenarios, is desirable to restrict communication of devices to within a certain geographical region (i.e. an authorized area). Ensuring that the mobile device is actually within the authorized area using positioning methods such as global positioning systems (GPS) may be difficult since the GPS signals appropriate to the authorized area may be spoofed (i.e. indicate that it is located in the authorized area, when in actuality it is outside of the authorized area).

SUMMARY

A system for location based security which includes a plurality of receivers. Each of the receivers determines times of arrival of received time varying signals. The system also includes a server in communication with the receivers and a mobile device. The server receives the times of arrival from the receivers, and times of arrival of the time varying signals determined by the mobile device. The server determines or validates a location of the mobile device based on the times of arrival. The server may then authorize the mobile device to perform secure communication over the secure communication network when the location of the mobile device is determined to be in an authorized communication area defined based on the times of arrival received from the receivers.

BRIEF DESCRIPTION OF THE DRAWINGS

The invention is best understood from the following detailed description when read in connection with the accompanying drawings, with like elements having the same reference numerals. This emphasizes that according to common practice, the various features of the drawings are not drawn to scale. On the contrary, the dimensions of the various features are arbitrarily expanded or reduced for clarity. Included in the drawings are the following figures.

DETAILED DESCRIPTION OF THE INVENTION

Figure 1:
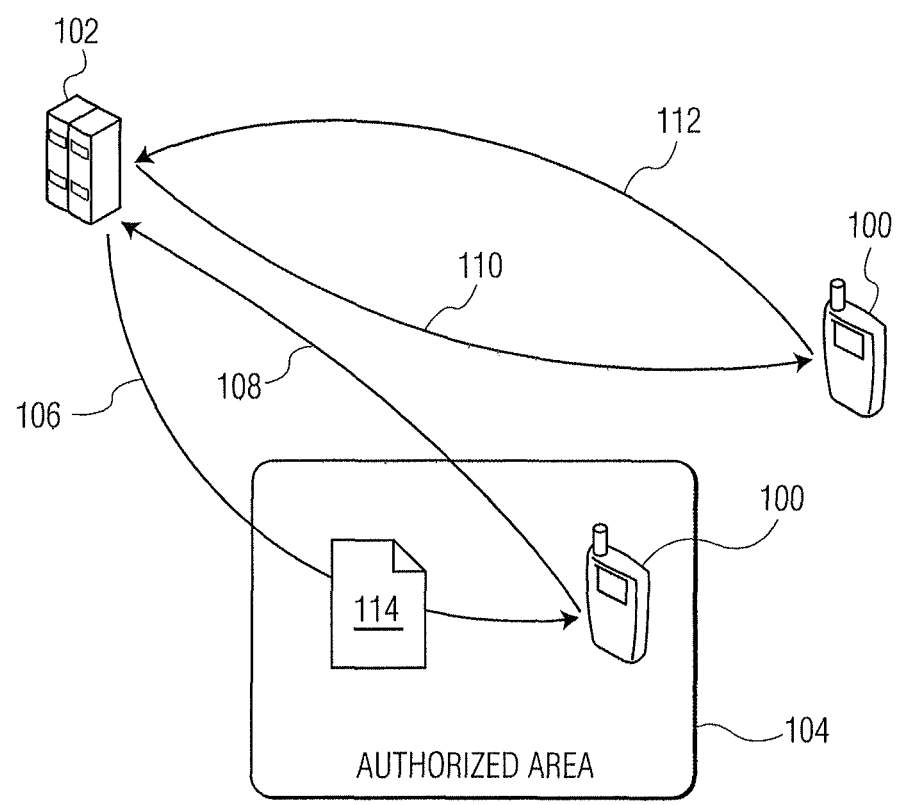
FIG. 1 shows the location based security system when the mobile device located inside of the authorized area and when the mobile device is located outside of the authorized area, according to an embodiment of the present invention.

FIG. 1 shows an example of a location based security system that includes a server 102 and a mobile device 100. In general, mobile device 100 may be able to communicate with a server and other devices on a network using encryption and decryption keys. These encryption and decryption keys may be supplied to the mobile device 100 via server 102. In this embodiment, however, the security of the system relies on location. That is, the location of the mobile device 100 determines when mobile device 100 can communicate with server 102.

Assuming area 104 is defined as a secure communication area, mobile device 100 (when located in area 104) may be able to perform bi-directional communication with server 102 via communication lines 106 and 108. Various data such as document 114 may then be transferred between the two devices. In general, communication of device 100 may be enabled (e.g. mobile device is given an encryption/decryption key) once server 102 determines that device 100 is actually located in area 104.

In another example, when server 102 determines that mobile device 100 is not in secure communication area 104, the bi-directional communication over lines 110 and 112 are restricted between mobile device 100 and server 102 (i.e., the server will not provide mobile device 100 with the proper encryption/decryption keys to perform communication over the network since it is not located in authorized communication area 104).

In general, the system shown in FIG. 1 provides a solution enabling geo-fences (e.g. a secure perimeter) to be used in the context of delivering the secure encryption/decryption keys for use of real time decryption. This enables secure communication to occur within the predefined perimeter of area 104. Outside of area 104 the secure communication is restricted. In some examples, secure communication area 104 may be an outdoor area or may be an indoor room which is deemed secure for mobile devices.

One way of ensuring that mobile device 100 is located in secure communication area 104 is to rely on time varying information that is received locally by mobile device 100. By restricting the time varying signals to within a specific local region, it becomes even more difficult for a third party to capture and reproduce information (i.e. spoof the time varying signal). Thus, the current system combines both time varying signals and space restrictions to achieve these results.

Figure 2:
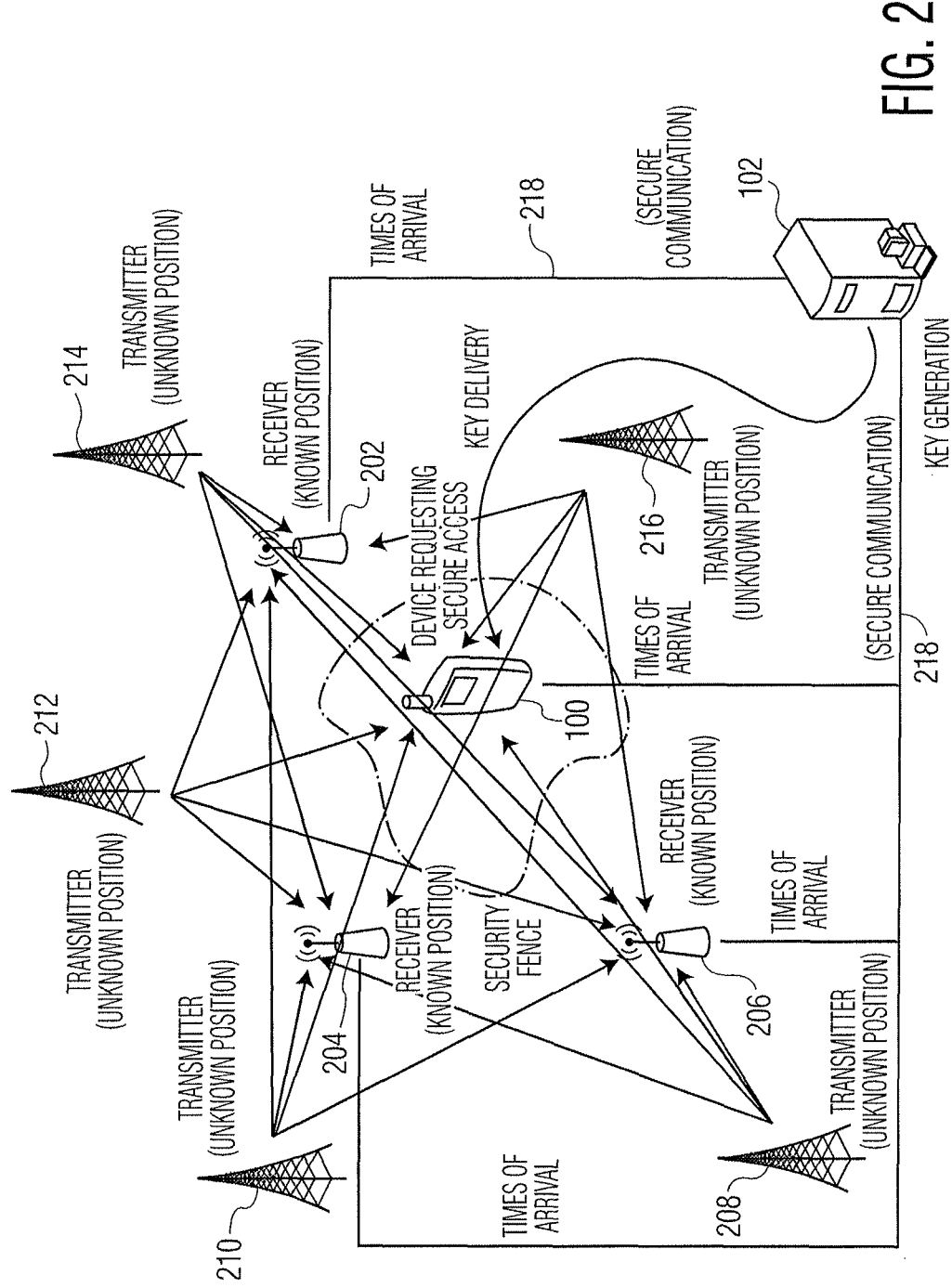
FIG. 2 shows the location based security system where receivers with known positions are used to define the authorized area, according to an embodiment of the present invention.

Shown in FIG. 2 is an embodiment where receivers 202, 204 and 206 are placed at known positions. In one example, the receivers may be placed such that their positions directly define a secure communication area (e.g. a triangular shaped area in between the receivers). More generally, however, the shape (e.g. perimeter) and the location of the of the secure communication area may be defined based on acceptable times of arrival of the RF signals received by the mobile device with respect to times of arrival of the RF signals received by the known receivers. This perimeter may be restricted to an area in between the receivers, or in an area just outside of the receivers. The example in FIG. 2 shows that the secure communication area has a somewhat kidney shaped perimeter that is partially in between and partially outside of a triangular region defined by the receivers.

In general, receivers 202, 204 and 206 are able to securely communicate via a secure communication channel 218 back to server 102. Receivers 202, 204 and 206 are also able to receive radio frequency signals from mobile device 100 as well as from transmitters 208, 210, 212, 214 and 216.

In operation, transmitters 208, 210, 212, 214 and 216 (which may be located at unknown positions) transmit RF signals to receivers 202, 204, 206 as well as to mobile device 10Q. These RF signals may have time varying characteristics. In one example, the time varying signals may be the measure of times of arrival of global system for mobile communications (GSM) extended training sequences (ETS). In general, both GSM and wideband code division multiple access (WCDMA) networks are non-synchronized systems making it difficult without specialized equipment to predict the times of departure of the signals. These signals will also vary simply because the transmitter clock is not absolutely stable which therefore causes changes in the transmission time.

Using techniques according to an embodiment of the subject invention, it is possible to capture times of arrival of the transmitted signals. It general, it is not necessary to know the positions of the transmitters. In one example, three receivers at known positions, a mobile receiver and five transmitters measured by all four receivers are implemented. Each of the receivers 202, 204 and 206 may measure the respective times of arrivals of the time varying signals transmitted from transmitters 208-216 thereby each providing an equation with three or four unknowns. In general, these unknowns may be the coordinates of the unknown transmitters, the time of departure of the signal and the clock offset related to the time of arrival with respect to the other receivers. In this example, the mobile device 100 requesting secure information also measures time of arrivals of the transmitted signals.

One benefit of this system is that solving the equations is restricted to quasi-contemporaneous times of arrival measurements from all the elements. In other words, the device cannot perform the calculations unless it has access to the measurements made by all the receivers at the known positions. In operation, each receiver at a known position communicates its respective time of arrival measurements on a regular basis (e.g., every few seconds) to sever 102. Mobile device 100 requesting a secure access can also deliver its own similar measurements to server 102. In general, these measurements may be delivered to server 102 via the secure communication channel 218. Server 102 may then combine these measurements from the three receivers and the mobile device to determine the validity of mobile device's position based on the predefined secure communication area defined by the positions of receivers 202-206.

Thus, the system first defines a secure communication area by positioning receivers 202-206 at specific locations. Then, in order for mobile device 100 to communicate over the secure network, mobile device 100 along with receivers 202-206 measure the times of arrival of the time varying signals transmitted from transmitters 208-216. These times of arrival are then transmitted from mobile device 100 and receivers 202-206 to centralized server 102 which determines if the mobile device is actually within the secure communication area. If server 102 determines that mobile device 100 is within the secure communication area, then server 102 may transfer cryptographic keys to mobile device 100 allowing mobile device 100 to securely communicate over the network to other devices (not shown). If server 102 determines that mobile device 100 is not located in the secure communication area, then the cryptographic keys will not be transferred to mobile device 100 thereby preventing mobile device 100 from communicating over the network.

In one example, for clarification purposes, suppose there are M receivers (e.g. a mobile terminal and a plurality of other receivers defining the secure communication area) in a network. Each receiver is able to measure times of arrival of RF signals transmitted by N common RF base-stations. The RF signals may be the ETS if the network is a GSM network. In general, however, the RF signals can be from any network where the data being transmitted is a non-predictable sequence. Each receiver is able to time stamp the data as it is being received which are then utilized by the server to determine the positions of the receivers relative to each other. The range equations for these systems are thus:

$$R_{ks} = \|x_k - b_s\| + \alpha_s + \epsilon_k, \quad (1)$$

where:
k=1 ... M, s=1 ... N
$x_k$=the two-dimensional location of the $k^{th}$ receiver
$b_s$=the location of the $s^{th}$ base-station
$\alpha_s$=the equivalent distance of the time offset of the $s^{th}$ base-station, and
$\epsilon_k$=the equivalent distance of the time offset of the $k^{th}$ receiver.

This defines a set of MN equations in 3M+N unknowns. The vector of variables, u, is given by equation (2).

$$u = (x_1, y_1, \epsilon_1, x_2, y_2, \epsilon_2, \ldots, x_M, y_M, \epsilon_M, \alpha_1, \alpha_2, \ldots, \alpha_N). \quad (2)$$

In practice all of the receivers make relative measurements, (i.e. the timings of the signals received from the base-stations are measured relative to one another). For example one of the base-station time offsets, say $\alpha_1$, would be set to zero since the time offset of the base-station relative to itself is zero, and all others are measured relative to it. Therefore there are 3M+N−1 unknowns.

Thus, two receivers (M=2) measuring five common base-stations (N=5) yields a set of 10 equations containing 10 unknowns which can be solved to yield the positions of both receivers and the time offsets of the five base-stations relative to one another. Similarly three receivers (M=3) each measuring four common base-station (N=4) yields a set of 12 equations with 12 unknowns allowing the positions of all three receivers to be determined as well as the relative time offsets of the base-stations. Thus, the centralized server in FIG. 2, can use the measurements from each of the three receivers and the fourth receiver (e.g. the mobile device) to determine the authorized area and if the mobile device is located in the authorized area.

Once the relative timings between the base-stations have been established linking any one of them to a master reference source, such as GPS time, allows the timings to determined relative to the same reference. Thus a single time transfer receiver may be used to transfer time via the measured relative timings of the base-stations to any of the receivers even though the network is unsynchronized. In one example, the transferred time could simply be the local clock of a selected one of the receivers which is utilized to establish a relative time with respect to the other receivers.

Figure 3:
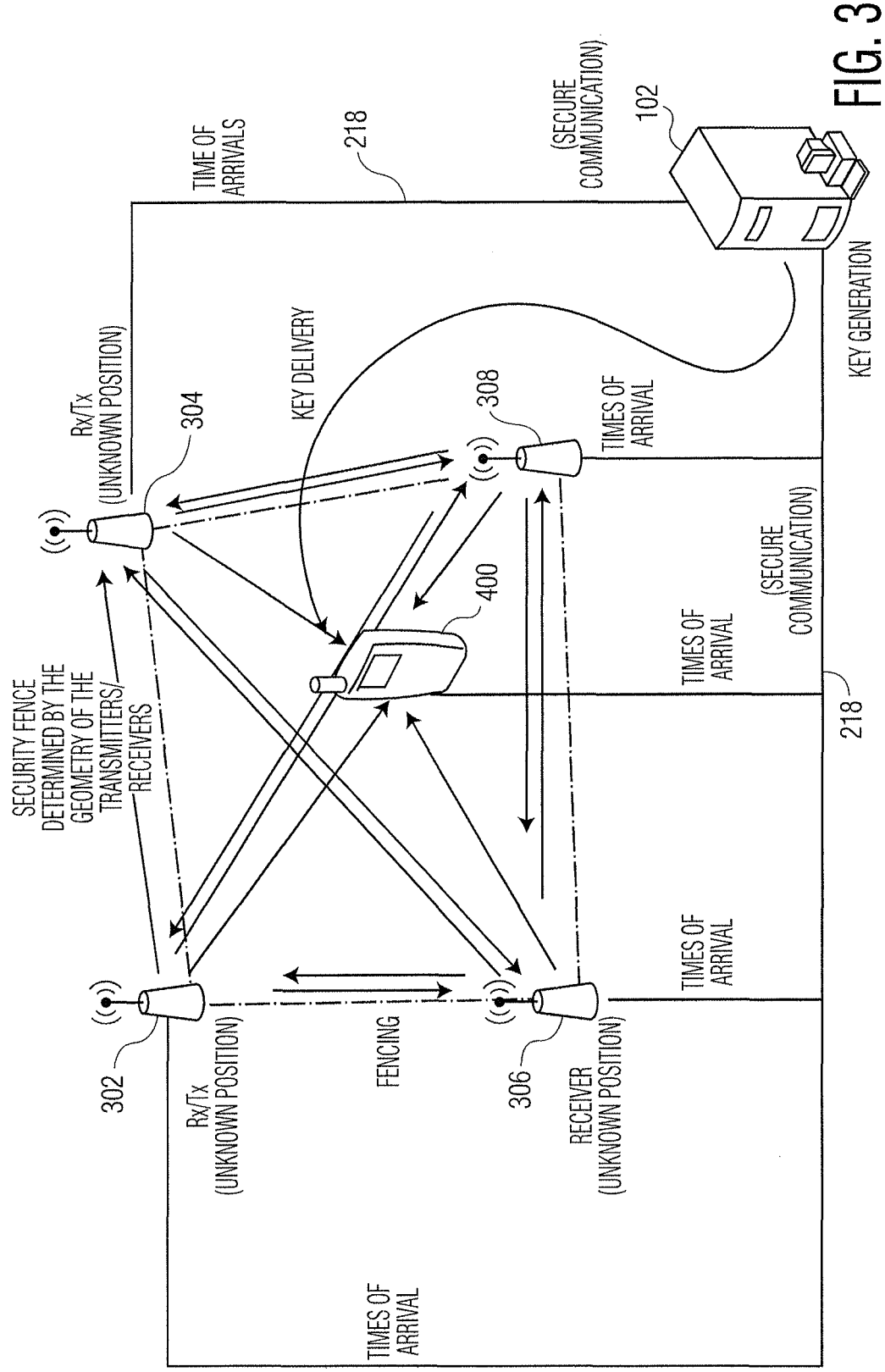
FIG. 3 shows the location based security system where transceivers with unknown positions are used to define the authorized area, according to an embodiment of the present invention.

In another embodiment shown in FIG. 3, rather than having separate transmitters and receivers, the system may include transceivers (e.g. WiFi or WiMax access points). In one example, transceivers 302, 304, 306 and 308 may be located at known or unknown positions creating a perimeter for the secure communication area (i.e., the secure communication area is located within the perimeter of the forward transceivers). Similar to the system in FIG. 2, these transceivers transmit time varying signals such as a detectable signal at a periodic interval which changes in an unpredictable manner.

Each of the four transceivers also acts as a receiver measuring the time of arrival of the time varying signals from all of the other transceivers.

Thus, each transceiver transmits a signal to the other three transceivers and also acquires measurements from the other three transceivers (i.e., each transceiver measures a set of three measurements). Similar to the system described in FIG. 2, upon receiving a time varying signal, the transceiver determines the time of arrival of the signal. Mobile device 100 will also receive these signals from all four transceivers and determine times of arrival.

Once these times of arrival are computed by the transceivers and the mobile device, they are transferred from all four transceivers 302-308 and mobile device 100 to secure centralized server 102 via secure communication line 218. Using these times of arrival as well as a universal time references utilized by each of the transceivers and the mobile device, server 102 is able to estimate the distance between the respective transceivers. Once the relative distance between the four transceivers is determined, the distance between the receivers and mobile device 100 may also be computed. This process ultimately determines if mobile device 100 is located within the perimeter of the secure communication area or not. As described above with respect to FIG. 2, server 102 either transfers cryptographic keys to mobile device 100 or does not transfer these keys to mobile device 100 depending on whether mobile device 100 is located in the secure communication area.

In one example, for computing the positions of the transceivers, assume each transceiver, $R_i$ (i=1, . . . , 4), has a clock having an offset from a universal time reference represented by $\epsilon_i$. The propagation delay of a signal from $R_i$ to $R_j$ is $t_{i,j}=t_{i,j}$, and the distance between transceivers $R_i$ and $R_j$ is given by:

$$d_{i,j}=d_{j,i}=t_{i,j}\times v, \quad (3)$$

where v is the propagation speed of the signal.

Each transceiver broadcasts an agreed timing signal at a particular time according to its internal clock. The rate of broadcast is low enough that there is no ambiguity in the receiver as to which signal has been received (e.g. on a millisecond boundary for transceivers that are less than a few Km apart). The other three transceivers and the mobile device also record the times of arrival of the signal. For any pair of transceivers, the arrival time may be represented by equation (4).

$$\tau_{i,j}=t_{i,j}-\epsilon_i+\epsilon_j, \quad (4)$$

where $\tau_{i,j}$ is the time of arrival measured at transceiver $R_i$ of the signal from transceiver $R_j$.

From equation (4), the propagation delay from $R_i$ to $R_j$ may be determined as shown in equation (5).

$$t_{i,j} = \frac{\tau_{i,j} + \tau_{j,i}}{2} \quad (5)$$

These equations provide an estimate for the values $d_{i,j}$.

Revisiting equation (3), each $\epsilon_i$ may be determined as $\epsilon_i=\epsilon_j+(t_{i,j}-\tau_{i,j})$, where the value in parentheses is known. In one example, it is assumed that $R_1$ lies at the origin of a 2-dimensional coordinate grid, $R_2$ is on the positive x-axis and $R_3$ is in the half plane y≥0. The values of $d_{1,2}$, $d_{1,3}$ and $d_{2,3}$ fix the relative positions of the transceivers uniquely. The values of $d_{1,4}$, $d_{2,4}$ and $d_{3,4}$ now uniquely determine the position of $R_4$ on the local grid.

Since the calculation is for relative clock offsets and positions, $\epsilon_i$ may be set to 0. Now, the four measurements made by the mobile device can be used in the same way as GPS measurements to give a position estimate for the mobile device, and the mobile device clock offset by using standard trilateration methods.

It is noted that the beacons (e.g. time varying signals) transmitted from transceivers 302-304 do not need to be surveyed (i.e., their absolute position does not need to be determined at setup time). In general, just the positions of transceivers relative to each other are needed in order to determine if the mobile devices are within the secure communication area (absolute positions are not necessary).

In general, FIGS. 2 and 3 show two embodiments where a secure communication area is defined. The time varying signals transmitted from the transmitters within the secure communication area, however, may be intercepted by other devices outside of the communication area. In order to further increase the security of the system, it would be beneficial to restrict the transmitted time varying signals to occurring only within the secure communication area (i.e., devices that are located outside of the secure communication area cannot receive the time varying signals). Examples of such a restriction is at least shown in FIGS. 4 and 5.

Figure 4:
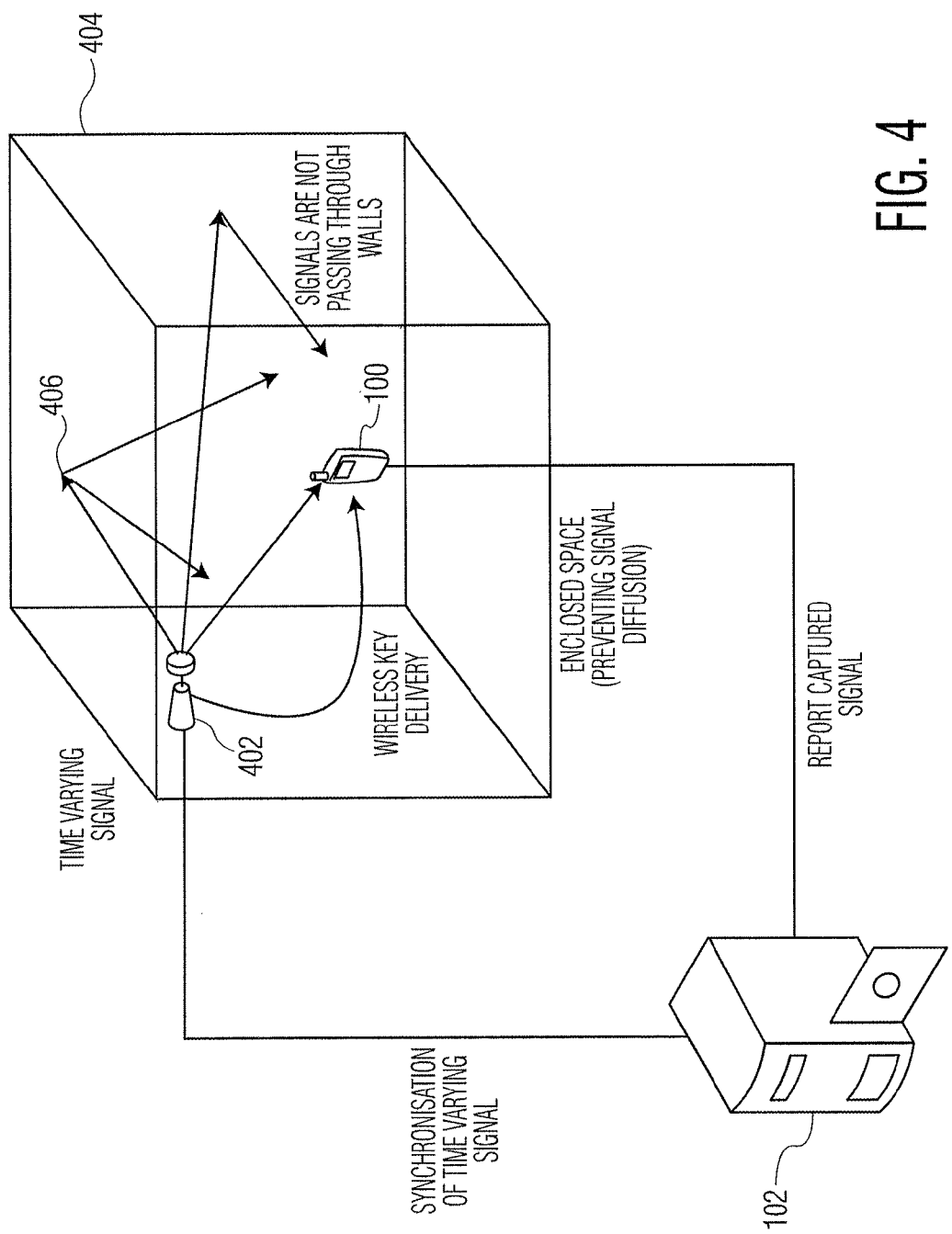
FIG. 4 shows the location based security system where the time varying signal is a radio frequency (RF) signal that is restricted within an authorized room, according to an embodiment of the present invention.

As shown in FIG. 4, a secure communication area may be defined as room 404 within a building. In one example, a beacon 402 (e.g. short-range transmitter) may be set up within room 404 in order to create a secure communication area within the room. To further increase the security, the physical characteristics of the RF waves transmitted by beacon 402 may be transmitted at high frequencies which have little or no penetration through the nearby walls of the room. In another example, the beacon may transmit infrared or ultrasonic signals which cannot penetrate the walls of the room. Alternatively, power reduction of the transmitted signal may also be utilized to restrict the transmission to only receivers within room 404. Thus, the example in FIG. 4, mobile device 100 would actually have to be in room 404 in order to receive the time varying signals from the transceiver. This will prevent a mobile device 100 located outside of the room from even receiving any of the signals.

Since the transmitted beacon signal is physically localized in the authorized area (i.e. the room) due to the short range transmission/reception, the data of a transmitted random or pseudorandom sequence (rather than the times of arrival) may be utilized by the system. Specifically, the data of the sequence may be received by the mobile device and/or other authorized receivers located in the authorized area, and then relayed back to the server for verification purposes. The server may compare the data captured by the receivers with the data captured by the mobile device to determine if a match occurs (i.e. determine if the authorized receivers and mobile device captured the same data sequence). The server may then compute the accuracy of the match or the number of matches to determine if the mobile device is located in the authorized area.

In a first example, during operation, server 102 could send the data sequence to beacon 402 over a secure connection. Beacon 402 could then locally transmit the sequence in room 404 using short-range transmission restricted by walls 406. Mobile device 100 receives the sequence and then relay the sequence back to server 102. Once received, server 102 can then compare the relayed sequence with the sequence transmitted by the beacon to determine if a match occurs. If a match occurs, then the cryptographic keys are delivered to mobile device 100.

In a second example, without the use of beacon 402, server 102 could also send the random or pseudorandom data sequence directly to mobile device 100 via an RF broadcast.

Mobile device 100 receives the sequence and then relays the sequence back to server 102 via a short-range receiver (not shown) located in the room that can only receive signals that are transmitted from within the room (e.g. infrared signals). In this example, it does not matter that other mobile devices outside of the room may receive the sequence via the RF broadcast, because these devices are not able to relay the sequence back to the server via the short-range (e.g. infrared) receiver located in the room, In a third example, during operation, the beacon itself could generate the random or pseudorandom data sequence independent of the server. In this example, room 404 includes a short-range receiver (not shown). In general, the beacon generates and transmits the sequence within the room. The sequence is received by both the mobile device 100 and the receiver (not shown) which are both located in the room. Both the mobile device and the receiver then relay their respectively received sequences back to server 102, where a comparison will be performed by the server. If a match occurs, then the cryptographic keys are delivered to mobile device 100.

Figure 5:
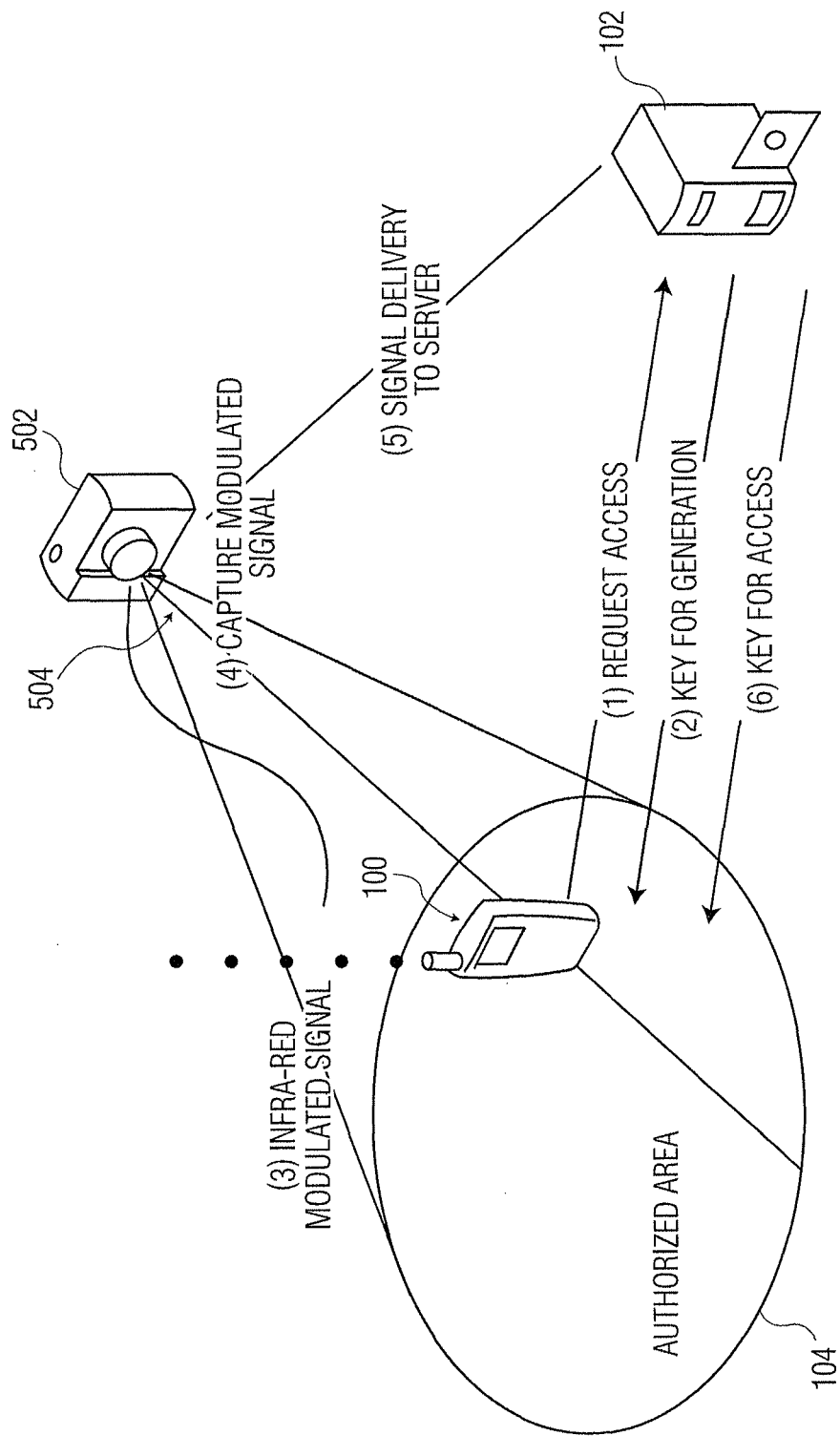
FIG. 5 shows the location based security system where the time varying signal is an infrared signal that is restricted within an authorized room, according to an embodiment of the present invention.

A specific example of the short-range receiver described in the second example, is shown in FIG. 5, where the room (i.e. authorized area) may be equipped with an infrared sensor (e.g. camera) (502). The random or psedorandom sequence as described above may be generated and transmitted by an infrared beacon (not shown) located within the room. In order to confirm its own location, device 100 (located in the room) transmits the data sequence as an infrared modulated signal 504 to infrared receiver 502. Infrared receiver 502 may then relay both the data sequence received from the mobile device and the data sequence received from the infrared beacon back to server 102 for confirmation. In general, transmission from the infrared receiver 502 to the server may be performed using standard RF communication or wired network transmissions. It is also noted that the infrared beacon may not be needed in this embodiment if the server generates the data sequence and transmits the generated sequence using RF signals.

The time varying data sequence in the embodiments of FIGS. 4 and 5 transmitted by the short-range beacon may be captured at regular intervals at a rate that may be a function of a rate in which the beacons are changing the sequence. The mobile device in the authorized area may also capture the short-range beacon in a similar manner.

The transceivers and receivers in FIGS. 2 and 3 are set at fixed positions which result in a static secure communication area. It is also contemplated, however, that the transceivers for example in FIG. 3 may not be stationary. For example, the transceivers 100 may be included on a vehicle such as an automobile or an airplane such that a secure communication area is defined within the interior of the vehicle. Thus, the absolute position of the transceivers and their defined secure communication area is actually varying as the vehicle travels. However, since the relative positions of the transceivers within the vehicle remain constant, the server will still be able to compute the relative positions of the transceivers and the mobile device 100.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for location based security, the system comprising:
   a server; and
   a plurality of receivers positioned at locations known to the server, wherein the plurality of receivers comprises a mobile device and each of the plurality of receivers including a processor configured to:
      determine times of arrival of time varying signals transmitted from a plurality of transmitters positioned at locations unknown to the server;
   wherein the server is in communication with the plurality of receivers and the mobile device positioned at a location unknown to the server, the server including a processor configured to:
      receive the determined times of arrival from the plurality of receivers, and times of arrival of the time varying signals determined by the mobile device over a secure communication network,
      determine a location of the mobile device based on the determined times of arrival received from the plurality of receivers and the determined times of arrival received from the mobile device, and
      authorize the mobile device to perform secure communication over the secure communication network when the location of the mobile device is determined to be in an authorized communication area defined based on the determined times of arrival received from the plurality of receivers.

2. The system of claim 1, wherein one or more of the time varying signals include a global system for mobile communications (GSM) extended training sequence (ETS).

3. The system of claim 1, wherein the plurality of receivers includes at least three receivers.

4. The system of claim 1, wherein the plurality of receivers are fixed at the locations known to the server to define a perimeter of the authorized communication area.

5. The system of claim 1, wherein the plurality of transmitters comprises at least one of cellular transmitters and wireless access points.

6. The system of claim 1, wherein the processor is further configured to authorize the mobile device to perform secure communication over the secure communication network by providing a cryptographic key to the mobile device to perform the secure communication over the secure communication network.

7. The system of claim 1, wherein the plurality of receivers and the mobile device compensate for timing errors when determining the times of arrival by utilizing a reference time source common to the plurality of receivers and the mobile device.

8. A system for location based security, the system comprising:
   a server: and
   a plurality of transceivers positioned at locations unknown to the server, wherein the plurality of transceivers comprise a mobile device and each of the plurality of transceivers including a processor configured to:
      determine times of arrival of time varying signals transmitted from other ones of the plurality of transceivers;
   wherein the server is in communication with the plurality of transceivers and the mobile device positioned at a location unknown to the server, the server including a processor configured to:
      receive the determined times of arrival from the plurality of transceivers, and times of arrival of the time varying signals determined by the mobile device over a secure communication network,
      determine a location of the mobile device relative to the plurality of transceivers based on the determined times of arrival received from the plurality of transceivers and the determined times of arrival received from the mobile device, and authorize the mobile device to perform secure communication over the secure communication network when the location of the mobile device is determined to be in an authorized communication area defined based on the determined times of arrival received from the plurality of transceivers.

9. The system of claim 8, wherein the plurality of transceivers are wireless access points (WAPs).

10. The system of claim 8, wherein the times of arrival determined by the plurality of transceivers and the mobile device are based on a common universal time known to the plurality of transceivers and the mobile device.

11. The system of claim 8, wherein the plurality of transceivers are positioned at fixed locations to define a fixed perimeter of the authorized communication area.

12. The system of claim 8, wherein the plurality of transceivers are mobile devices having substantially predetermined locations relative to one another to define a mobile authorized communication area.

13. The system of claim 8, wherein the plurality of transceivers transmit the time varying signals using radio frequency (RF) signals with at least one of: a frequency and a power level that physically restricts the time varying signals to being received within the authorized communication area.

14. The system of claim 8, wherein the plurality of transceivers and the mobile device transmit the time varying signals using infrared (IR) signals to restrict the time varying signals to being received within the authorized communication area.

15. A method for location based security in a system including a plurality of receivers, the method comprising:

receiving, by the plurality of receivers, time varying signals, wherein the plurality of receivers comprise a mobile device;

determining, by the plurality of receivers, times of arrival of the received time varying signals, wherein the received time varying signals are transmitted from a plurality of transmitters positioned at locations unknown to a server;

receiving, by the server from the plurality of receivers, the determined times of arrival of the received time varying signals;

determining, by the server, a location of the mobile device based on the determined times of arrival of the received time varying signals received from the plurality of receivers, and the determined times of arrival of the received time varying signals received from the mobile device, and authorizing the mobile device to perform secure communication over a secure communication network when the location of the mobile device is determined to be in an authorized communication area defined based on the determined times of arrival of the received time varying signals received from the plurality of receivers.

16. The method of claim 15, wherein the time varying signals include unpredictable data sequences.

17. The method of claim 15, wherein the plurality of receivers and the plurality transmitters comprise transceivers that transmit the time varying signals, and wherein the server utilizes the time varying signals and the times of arrival to determine the locations of each of the transceivers and the mobile device.

18. The method of claim 15, wherein each of the plurality of receivers and the mobile device utilize a common universal time.

19. The method of claim 15, wherein the time varying signals are transmitted using at least one of: an RF frequency, an RF power, and an optical wavelength that restricts reception of the time varying signals to within the authorized communication area.

* * * * *